United States Patent [19]

Miller

[11] Patent Number: 5,915,104
[45] Date of Patent: Jun. 22, 1999

[54] HIGH BANDWIDTH PCI TO PACKET SWITCHED ROUTER BRIDGE HAVING MINIMIZED MEMORY LATENCY

[75] Inventor: Steven C. Miller, Livermore, Calif.

[73] Assignee: Silicon Graphics, Inc., Mountain View, Calif.

[21] Appl. No.: 08/780,781

[22] Filed: Jan. 9, 1997

[51] Int. Cl.[6] .................................................. G06F 13/42
[52] U.S. Cl. .................... 395/309; 395/308; 395/872; 395/585
[58] Field of Search .................................. 395/306, 308, 395/309, 311, 287, 292, 842, 848, 847, 856–857, 858–859, 881, 872, 584, 585, 586, 587; 711/118, 140, 141–146

[56] References Cited

U.S. PATENT DOCUMENTS

| | | | |
|---|---|---|---|
| 5,594,882 | 1/1997 | Bell ......................................... | 711/212 |
| 5,664,117 | 9/1997 | Shah et al. ............................... | 395/281 |
| 5,673,399 | 9/1997 | Guthrie et al. ........................... | 395/308 |
| 5,761,450 | 6/1998 | Shah ........................................ | 395/287 |
| 5,761,461 | 6/1998 | Neal et al. ............................... | 395/309 |
| 5,771,359 | 6/1998 | Galloway et al. ....................... | 395/308 |

*Primary Examiner*—Ayaz R. Sheikh
*Assistant Examiner*—Raymond N. Phan
*Attorney, Agent, or Firm*—Wagner, Murabito & Hao

[57] ABSTRACT

In a computer system, a mechanism for minimizing memory latencies. An improved, high-speed packet switched router is used to route packets quickly and efficiently between the microprocessor and the main memory. The computer system also supports PCI devices by implementing a bridge which acts as an interface between the PCI bus and the packet switched router. In order to minimize the memory latencies for PCI based memory accesses through the bridge, a plurality of read and write buffers are implemented. Write gathering is used to gather a plurality of write transactions on the PCI bus into the write buffers and sent by the bridge as one cache line sized transfer to the routing mechanism. For PCI based read operations, data is pre-fetched from the main memory and stored in the read buffers. Thereby, PCI devices can access the read buffers multiple times to retrieve the requested data.

16 Claims, 4 Drawing Sheets

HIGH BANDWIDTH PCI TO PACKET SWITCHED ROUTER BRIDGE HAVING MINIMIZED MEMORY LATENCY

FIELD OF THE INVENTION

The present invention pertains to a high bandwidth bridge mechanism which minimizes memory latencies for optimal performance.

BACKGROUND OF THE INVENTION

In the past, computers were primarily applied to processing rather mundane, repetitive numerical and/or textual tasks involving number-crunching, spread sheeting, and word processing. These simple tasks merely entailed entering data from a keyboard, processing the data according to some computer program, and then displaying the resulting text or numbers on a computer monitor and perhaps later storing these results in a magnetic disk drive. However, today's computer systems are much more advanced, versatile, and sophisticated. Especially since the advent of multimedia applications and the Internet, computers are now commonly called upon to accept and process data from a wide variety of different formats ranging from audio to video and even realistic computer-generated three-dimensional graphic images. A partial list of applications involving these multimedia applications include the generation of special effects for movies, computer animation, real-time simulations, video teleconferencing, Internet-related applications, computer games, telecommuting, virtual reality, high-speed databases, real-time interactive simulations, medical diagnostic imaging, etc.

The reason behind the proliferation of multimedia applications is due to the fact that much more information can be conveyed and readily comprehended with pictures and sounds rather than with text or numbers. Video, audio, and three-dimensional graphics render a computer system more user friendly, dynamic, and realistic. However, the added degree of complexity for the design of new generations of computer systems necessary for processing these multimedia applications is tremendous. The ability of handling digitized audio, video, and graphics requires that vast amounts of data be processed at extremely fast speeds. An incredible amount of data must be processed every second in order to produce smooth, fluid, and realistic full-motion displays on a computer screen. Additional speed and processing power is needed in order to provide the computer system with high-fidelity stereo, real-time, and interactive capabilities. Hence, speed is of the essence in designing modern, state-of-the-art computer systems.

One of the major bottlenecks in attaining faster, greater bandwidth computer systems pertains to the current bus architecture. The standard bus architecture found in most personal computers today is the Peripheral Component Interconnect (PCI) bus. A PCI bus is comprised of a set of wires that is used to electrically interconnect the various semiconductor chips and input/output devices of the computer system. Electric signals are conducted over the bus so that the various components can communicate with each other. This type of bus architecture offers a simple, efficient, and cost-effective method of transmitting data. For a time, it was also sufficient to handle the amount of data flowing between the various devices residing within the computer system. However, as the demand for increased amounts of data skyrocket, the PCI bus is rapidly becoming inadequate to handle the increase in data transmissions.

In light of the shortcomings inherent to the PCI bus architecture, designers have to find ways to improve the speed at which bits of data can be conveyed. For example, one such solution is to implement a switched router as described in the patent application entitled "Packet Switched Router Architecture For Providing Multiple Simultaneous Communications," Ser. No. 08/717580, filed on Sep. 23, 1996, and assigned to the assignees of the present invention. Rather than having a shared bus arrangement, a central "switchboard" arrangement is used to select and establish temporary links between multiple devices. Packets of data are then sent over the links. By selecting and establishing multiple links, the central switchboard allows multiple packets to be simultaneously sent to various destinations. This results in significantly greater bandwidth. There exist many different, improved bus architectures to meet the high bandwidth requirements.

However, a common problem with any new bus architecture is that various peripheral devices designed specifically for connection to a PCI bus are now rendered incompatible. Existing PCI devices (e.g., modems, disk drives, network controllers, printers, etc.) are designed specifically for a PCI type bus scheme. As such, they are incompatible with and cannot be connected to any non-PCI based bus design. Of course, the computer industry could establish a new, faster bus standard. However, this is a lengthy, complicated, highly contentious, and extremely expensive process. The entire computer industry would have to make a wholesale switch over to the new bus standard. And until a new bus standard is adopted, computer manufacturers are hobbled by the outdated PCI bus architecture.

An alternative option is to implement a PCI bus in conjunction with a new, faster bus architecture (e.g., a packet switched router architecture). A bridge device is interposed between the two different bus schemes and acts as an interface. This approach works fine, except that an extra delay is incurred when data is routed through the bridge. In particular, the main memory and CPU are coupled to the new bus structure on one side of the bridge to take advantage of its higher bandwidth, whereas the PCI devices are coupled to the PCI bus on the other side of the bridge. Consequently, read/write operations involving PCI devices require that data be routed to/from a PCI device via the PCI bus, through the bridge, to the new bus, and to/from the main memory. These memory accesses through the bridge result in added memory latencies. The extra memory latencies associated with the bridge may exceed the tolerances of some PCI devices. Thus, there is a need for some mechanism to hide or minimize this memory latency so that high speed PCI devices may be serviced. The present invention provides a novel, effective solution for minimizing latencies in a way that allows standard PCI devices to operate and yet keeps up with higher data rates. The present invention accomplishes this feat by implementing a combination of special write gathering/buffering, read prefetching/buffering, flushing, interrupt, and virtual device operations.

SUMMARY OF THE INVENTION

The present invention pertains to a mechanism in a computer system for minimizing memory latencies. An improved, high-speed packet switched router is used to route packets quickly and efficiently between the microprocessor and the main memory. The computer system also supports PCI devices by implementing a bridge which acts as an interface between a PCI bus and the packet switched router. In order to minimize the memory latencies for PCI based memory accesses through the bridge, a plurality of read and write buffers are implemented. Write gathering is used to gather multiple write transactions on the PCI bus into the write buffers and sent by the bridge as one cache line sized transfer to the routing mechanism. This write gathering technique is performed on a per device basis rather than on a bus basis. Consequently, the bridge may select particular devices to perform write gathering, while exempting other devices.

For PCI based read operations, data is pre-fetched from the main memory and stored in the read buffers. Thereby, PCI devices can access the read buffers multiple times to retrieve the requested data. Furthermore, there are three different types of read operations: precise reads, non-precise reads, and pre-fetched reads. Other features of the present invention include a virtual device, whereby one or more specific bits are used to differentiate between multiple streams running on a single PCI controller. Buffers are allocated according to these bits. Thereby, multiple streams will not interfere with each other while data integrity is preserved. Another aspect of the present invention pertains to a novel use of interrupts. Specific buffers may be flushed under the control of an interrupt signal. These and other features of the present invention are claimed and described in detail below.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
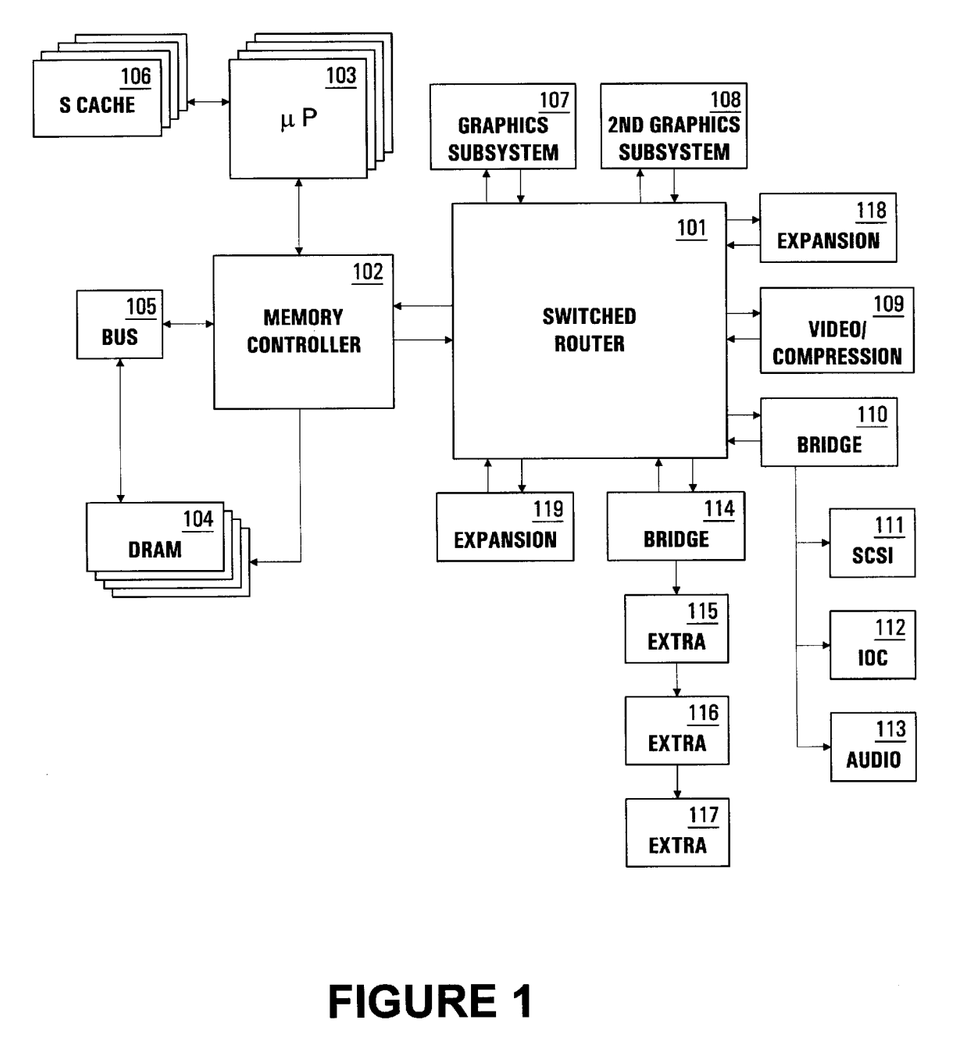
FIG. 1 shows an exemplary computer system upon which the present invention may be practiced.

In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention. It should further be noted that there exists many different computer system configurations to which the present invention may be applied. One such exemplary computer system is shown in FIG. 1. Switched packet router 101 has a pair of direct point-to-point connection to memory controller 102. Memory controller 102 facilitates the transfer of data between one or more microprocessors 103 and main memory 104, which is comprised of DRAM SIMMs. A high-speed (e.g., 1 GBytes/sec) memory bus 105 is used to couple memory controller 102 with the actual main memory 104. To improve performance, the microprocessors 103 can temporarily cache data in the SRAMs 106. Other "widgets" or devices which may be connected to switched packet router 101 include one or more graphics subsystems 107–108. The graphics subsystems 107–108 perform functions such as scan conversion, texturing, anti-aliasing, etc. Furthermore, a video board 109 having compression/decompression capabilities can be connected to switched packet router 101. Additional devices may also be connected to the switched router 101. Each of the devices connected to switched router 101 has its own dedicated transceiver for transmitting and receiving digital data. Each device also has two links: one for transmit (source link) and one to receive (destination link). A link is defined as the physical connection from the switched router 101 to any of the connected devices. A link may be uni-directional or bi-directional.

The currently preferred bus architecture employs a high-speed, packet-switched protocol. A packet of data refers to a minimum unit of data transfer over one of the links. Packets can be one of several fixed sizes ranging from a double word (i.e., 8 bytes) to a full cache line (i.e., 128 bytes) plus a header. Packets are comprised of a 32-bit command word and some or all of the following: a 48-bit address, 16-bit remote map field, data field, and a data enable word. The command word contains destination and source identification numbers, packet type, transaction number, data size, arbitration and control bits. The packets can be grouped into two functional types: request packets and response packets. A request packet initiates an operation, whereas response packets are those which reply to a request packet. One or more packets of data are transmitted from one or more source devices over the established links through the switched router 101 to one or more destination devices. Afterwards, switched router 101 can be commanded to establish different links between different devices. Thereupon, packets of data may be transmitted from any of the interconnect devices. With this new routing architecture, bandwidth is increased to the desired degree merely by establishing additional links. The switched router is described in detail in the patent application entitled "Packet Switched Router Architecture For Providing Multiple Simultaneous Communications," Ser. No. 08/717580, filed on Sep. 23, 1996, and assigned to the assignees of the present invention.

A bridge device 110 may also be connected to switched router 101. The bridge 110 acts as an interface so that various off-the-shelf PCI devices (e.g., printers, monitors, modems, disk drives, etc.) may be coupled to the computer system via standard SCSI 111, IOC 112 and audio 113 ports. A second bridge 114 may be added to provide expansion PCI slots 115–117. Ports 118 and 119 are used to provide future growth and upgradeability for the computer system.

Figure 2:
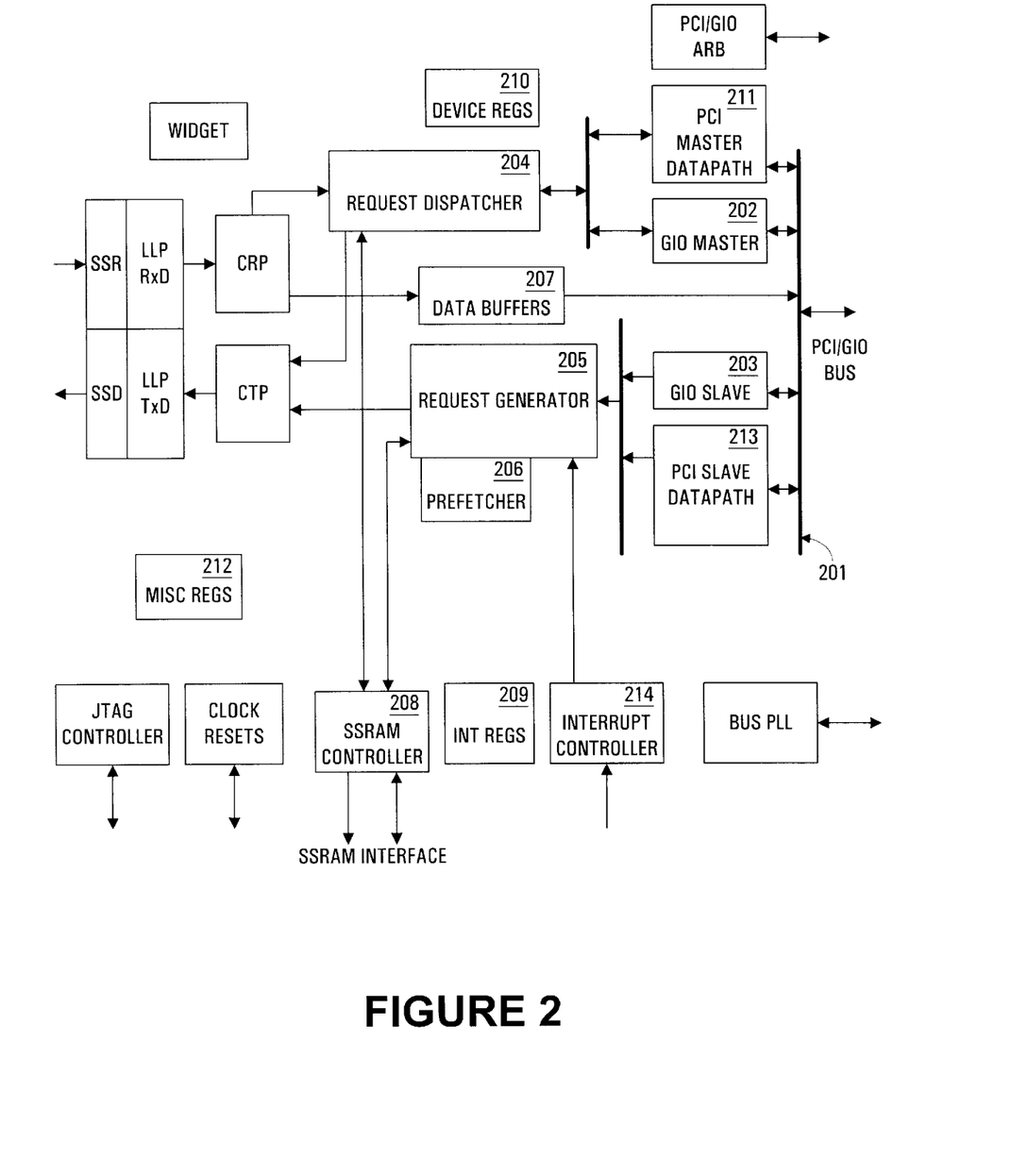
FIG. 2 shows a detailed block diagram of the currently preferred design for the bridge.

FIG. 2 shows a detailed block diagram of the currently preferred design for the bridge. The bridge is implemented as an ASIC chip for providing communications with the system through an 8-bit interconnect link to the packet switched router and a standard PCI bus.

The PCI Local Bus 201 is a 32-bit or 64-bit bus with multiplexed address and data lines. The synchronous bus can operate at a speed up to 33 MHz in burst mode which provides a very high host/memory to peripheral transfer rate. The bus is processor independent and devices are configurable by the host. PCI devices can act as a bus master to transfer data to and from the host or they can access other local PCI devices or devices on another side of the packet switched router. Supporting PCI Bus allows the user to have a large number of third party high performance, low cost peripheral devices to choose from to provide most functionalities and best I/O throughput. GIO Bus is very similar to PCI Bus. They both have multiplexed address/data buses, device dedicated bus request/grant lines, and both support burst transfer mode. The Bridge supports a 64-bit pipelined GIO Bus. The Bridge functions as both master 202 and slave 203 to the GIO Bus.

The request dispatcher 204 decodes and distributes all incoming requests to the different functional units. It is also responsible for returning the response from those requests, providing any address translation, and error checking. Packet switched router to PCI/GIO bus translation mechanism consists of generating a PCI/GIO bus address from the packet switched router address. This translation occurs using fixed regions defined in device slot space and auxiliary I/O space. The request generator 205 is responsible for request packet generation, address translation, and response buffer management. The request generator translation mechanism uses two mapping techniques, a direct map scheme for a portion of system memory and a page mapped scheme for the rest. The direct map scheme uses internal registers and predefined areas to perform mapping. The page map scheme uses a Page Mapping Unit (PMU) to perform address translation on a page basis. To speed up the read access performed by the PCI/GIO devices to data residing across the packet switched router Bus, the Prefetcher circuit 206 decides whether to prefetch more data following current address. This enables faster read response time when sequential reads are performed by the PCI/GIO I/O devices.

Data Buffers 207 provide speed and data buffering between packet switched router Interconnect and PCI/GIO circuit. It off loads read/write packets from high speed, non-stallable Switched packet router Bus to the lower performance, two-way handshaking PCI/GIO buses 201. When the command is from PCI/GIO to Switched packet router, address and data are first gathered at Data Buffers 207 before they are read by the PCI/GIO PMU. The SSRAM/FLASH controller 208 supports local SSRAM used by the PMU for storage of address translation entries and FLASH for boot support. The internal registers 209 in the Bridge reside in a Switched packet router address region known as "widget space". Every widget has a 16 MByte widget space located in system address space based on widget id number. The Bridge ASIC can occupy any widget id number from 0×2 through 0×f. All registers in the Bridge are 32-bits or less in size and are aligned to a double-word boundary. The registers are located on data bits 31:0 of the double word. The registers can be accessed by Switched packet router double-word packet type with 4 data enables only (32-bit load/store only). Access by other packet type results in an address error exception. There are two device registers 210 for each of the eight devices on the PCI/GIO bus, one register for read response buffer allocation and the other for general control and mapping.

The Bridge ASIC also contains special buffering for two different data paths. The one path is used for operations generated from a widget as a master (pio mode). An example of those operations are such things as load/store operations from the processor. The other path is for operations initiated by a bus master from the PCI/GIO bus (dma mode). An example of these operation would be a SCSI DMA. The buffering in the Bridge ASIC allows peak performance on both the PCI/GIO buses and the Switched packet router Interconnect. The next few sections define the operational flushing policies, programming and use of the buffers in the ASIC. The widget master buffers consist of a request fifo (in the request dispatcher 204), a request ping-pong (in the PCI master 211), and a response ping-pong buffer (in the request dispatcher 204). These buffers allow smooth flow of request operations through the bridge. The request fifo holds initial requests until the request dispatcher 204 can route the request to the proper section of the Bridge ASIC. This fifo can hold three cache line or quarter cache line write requests or up to fifteen, read or double word write requests. The Bridge automatically handles the packing and proper credit management of smaller packets. If the operation is to the PCI/GIO bus, the ping-pong buffer provides an additional two operation buffer. If the operation requires a response, the PCI/GIO bus and the SSRAM/FLASH share the ping-pong response buffer.

There are two types of PCI master buffers used in the Bridge ASIC, read response buffers and write buffers. Read response buffers are used to hold the data returned from a read request made by the PCI master or the prefetcher. Write buffers are used to hold the data from a PCI master write operation until it can be sent on the Switched packet router interconnect.

The bridge ASIC contains sixteen read response buffers, split into two groups: the even device group and the odd device group. The read response buffers are hard allocated to a PCI master device by using the even/odd device response buffer registers. The PCI device number is based on which physical bus request/grant pair is used. The Bridge ASIC PCI bus supports eight bus request/grant pairs. To allocate a buffer to a given device, the buffer must have its enable bit and the two most significant bits of the device number set. The LSB of the device number is implied by the use of even or odd read response register. The reason for the even/odd buffer is to reduce the compare logic required. This does limit the maximum number of buffers which can be used with any single bus request/grant pair to eight. In addition, each device can have two virtual request/grant pairs within a single bus request/grant pair. The Bridge ASIC provides three kinds of PCI to Switched packet router request mapping which effect read response buffer operations: precise, non-precise, and prefetched. All read operations require at least one buffer to be allocated to that bus request/grant pair. Those devices which can use multiple buffers, a buffer must be ready to be assigned to the current transaction. If all the buffers for a given device are in use, then the transaction is retried and no information is stored. Since all PCI operations which are retried with no data transfer will be repeated there is no data loss problems.

A precise PCI read operation causes the Bridge ASIC to issue a retry on the PCI bus and generate a double word Switched packet router operation requesting only those bytes selected by the PCI byte enables. The PCI device continues to request the bus and perform the read operation. The Bridge ASIC will continue to issue retries until the response arrives and then the next read operation will provide the requested data. The Bridge ASIC compares exact address and byte enables in this mode. After the read is complete, the buffer is ready for another transaction.

Figure 3:
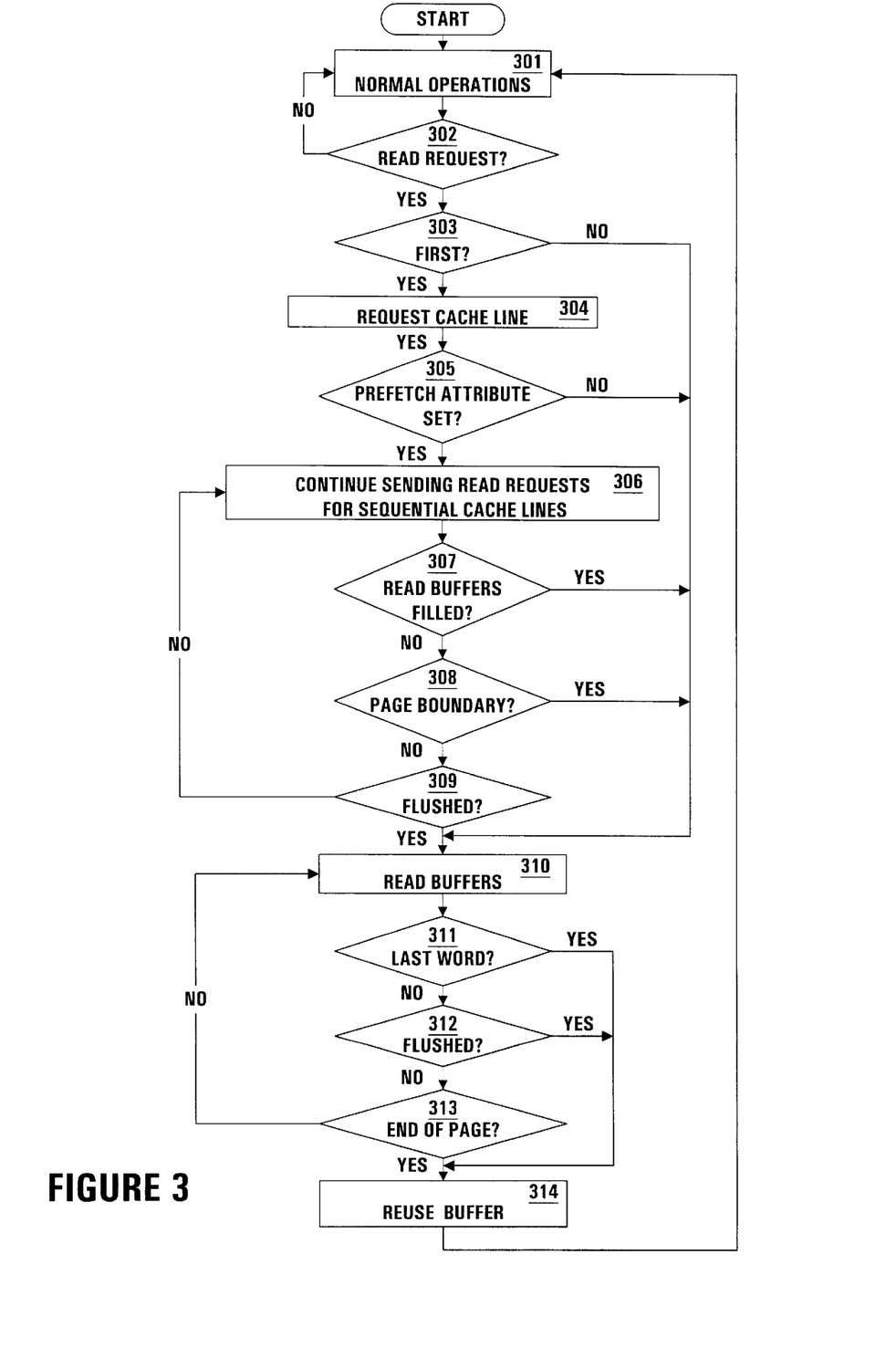
FIG. 3 shows a flowchart describing the steps for performing read operations with pre-fetching.

FIG. 3 shows a flowchart describing the steps for performing read operations with pre-fetching. Initially, the computer system performs its routine operations until a read transaction generated from a PCI device is detected, steps 301–302. Thereupon, a determination is made as to whether this particular read request is the first one issued by the PCI device, step 303. If it is not the first read request, then the requested data is retrieved from the read buffers, step 310. Otherwise, for a first read request, a request is made to retrieve an entire cache line from the memory, step 304. A determination is made as to whether the prefetch attribute was set for this particular PCI device, step 305. If the pre-fetch attribute was not selected, the data is retrieved from the read buffers, step 310. Otherwise, sequential cache lines from the memory are loaded into the read buffers, step 306. This process continues until either the read buffers become full (step 308), a page boundary is encountered (step 309), or the buffers are caused to be flushed (step 309). Next, the buffers are read, step 310. Subsequent read transactions can access the same buffers because data had been subsequently prefetched. Subsequent buffer accesses can continue until either the last word has been retrieved (step 311), the buffers are caused to be flushed (step 312), or the end of the page is encountered (step 313). Thereupon, the read buffers can be reused, step 314.

Read response buffers filled by a precise operation are flushed based on the following rules: 1) When a write from the same master and an address match occurs; 2) When an interrupt occurs from a interrupt pin assigned to the device associated with the buffer; 3) Single access to the buffer (normal completion); 4) PCI master write access to 0x3fff_0000 through 0x3fff_ffff; and 5) PIO flush.

A non-precise PCI read operation behaves like the precise transaction except that the Bridge ASIC generates a Switched packet router cache line address bits are used for the compare. Accessing the buffer at any address within the cache line provides a response and will continue (bursting) until either the end of the cache line is reached or the PCI cycle is terminated by the master. At this point, the buffer is ready for reuse. Read response buffers filled by a non-precise operation are flushed based on the same rules given above for precise operations.

A prefetched PCI read operation starts similar to the previous operation. First, a retry is issued on the PCI bus; a Switched packet router cache line request is issued, and the prefetcher 206 is enabled for this transaction. The prefetcher 206 stores the next cache line address and looks for addition free buffers currently assigned to the requesting device. If additional assigned buffers are free, then the prefetcher 206 will launch incremental cache line read requests until all the buffers are in use. The prefetcher 206 can be enabled to stop at either a 4K or 16K page boundary. The prefetcher 206 will continue to search for free buffers and posting read request until either a page crossing or a flush condition is reached. The prefetcher 206 can only increment linearly on physical addresses. Prefetched reads also effect when a buffer is available for the next transaction. Both the precise and non-precise operation only allow a single bus tenure to access the buffer then the buffer free for use in the next transaction. The prefetched buffer allows multiple bus tenures to access the buffer until the last (most significant word) single/double word is accessed (32-bit/64-bit bus). With the last access, the buffer is ready for another transaction. In the currently preferred embodiment, the Bridge is optimized for a burst length of 128 byte boundary. The cache line size on this machine is 128 bytes. By doing transfers that are exactly one cache line the cache coherency operations are much more efficient. The memory system is also optimized for blocks of this size and alignment. Other size transfers will work, but they will not be as efficient.

Read response buffers filled by a prefetch operation are flushed based on the following rules: 1) When any non-sequential read is performed by the PCI master (breaking stream); 2) When a write from the same master occurs; 3) When an interrupt occurs from a interrupt pin assigned to the device associated with the buffer; 4) Access to the last word of data in the buffer (normal completion); 5) PCI master write access to 0x3fff_0000 through 0x3fff_ffff; and 6) PIO flush.

Now, the PIO(Processor) Flush operation is discussed. The read response buffers can be cleared with a PIO by setting the corresponding enable bit in the even/odd read response buffer registers 212 to zero, then checking the read response buffer status register. If the RRB_INUSE bit is set then, one must wait until the RRB_VALID bit is set and the RRB_INUSE bit is clear. A PIO to the corresponding RRB_CLEAR bit clears the buffer. If both the RRB_VALID and RRB_INUSE are dear then the buffer is cleared. This is also the mechanism used to reassign buffers "on the fly" to other devices. When a buffer is clear and disabled, it can be reassigned to another device.

From the above rules of operation for the read response buffers, a single PCI master device could have either a single prefetch stream, or multiple random precise/non-precise requests equaling the number of buffers allocated. This functions well for some devices, but others (e.g., scsi controllers) may have a large data stream which uses the prefetch feature and an occasional dma descriptor read to an unrelated address. Using the above rules, the data stream is flushed on every descriptor read. This will negativity impact performance. It is for cases like these, that the virtual request feature solves. To use this feature, the PCI master must be able to generate 64-bit PCI addresses. The Bridge uses PCI address bit 57 to differentiate between the virtual read streams. The even/odd read response buffer registers have a bit for each buffer to select virtual buffer. This bit is compared against address bit 57 in selecting or clearing the buffers.

Unlike the read response buffers, the seven write buffers residing within the PCI slave datapath 213, are dynamically allocated by the PCI slave logic. This allows the maximum performance for the minimum amount of buffer ram. The Bridge ASIC supports a dual ring arbitration scheme, allowing PCI devices to be either real-time or not. Any non-real time device must leave two write buffers free at all times. If a write occurs and only two buffers are free, then the write is retried until more buffers are free. Any real time device cannot use more than five buffers at a time, and must leave at least one free if it already has write buffers in use.

These rules apply to all cache line aligned transfers. Non-aligned transfers must be broken up into quarter cache transfers (on the Switched packet router interconnect) or write gathered. PCI devices which are not able to burst an entire 128 byte cache might use write gathering mode on the write buffers. By setting the write gather bits in the device (x) registers, when a write occurs, the data is gathered into larger units to be sent on Switched packet router. A PCI device can only have a single write gather buffer in use at one time.

Figure 4:
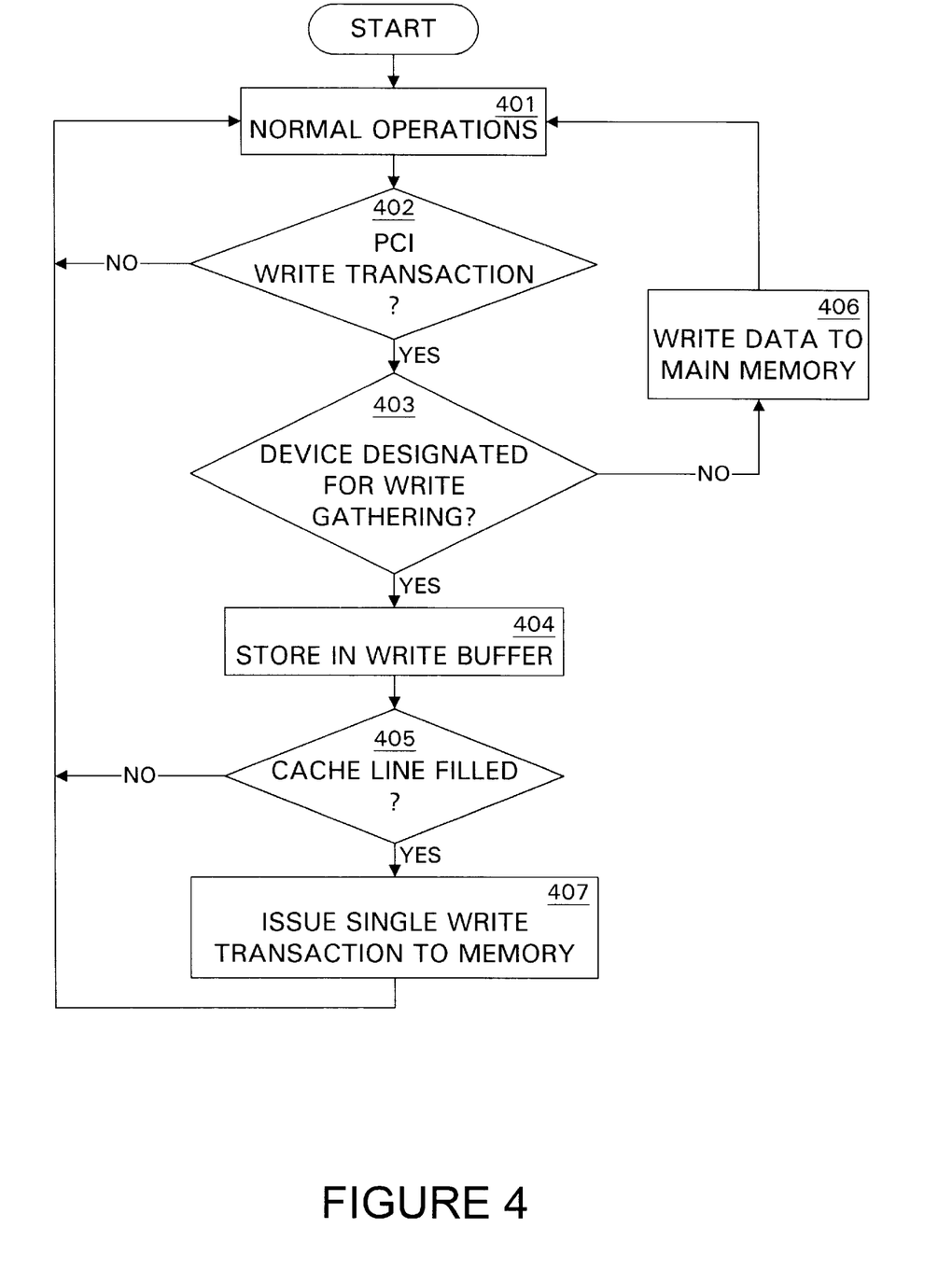
FIG. 4 shows a flowchart describing the steps for performing write gathering.

FIG. 4 shows a flowchart describing the steps for performing write gathering. Initially, the computer system performs its routine operations until a write transaction generated from a PCI device is detected, steps 402. Thereupon, a determination is made as to whether that particular PCI device has been designated for write gathering, step 403. If it has not been selected to be write gathered, the data is written to the main memory via the bridge, step 406. Otherwise, the data to be written is stored in the write buffers, step 404. At that point, step 405 determines whether a cache line has been filled. If an entire cache line is full of data, a single write transaction to the main memory from the bridge is executed, step 407. Normal operations continue, step 401.

Flushing of the write buffers is done when the following occurs: 1) A read from the device corresponding to the gather buffer; 2) A non-contiguous write; 3) An interrupt from the interrupt pins associated with the device; 4) A PIO access to the write request buffer flush register; or 5) PCI master write access to 0x3fff_0000 through 0x3fff_ffff. In the currently preferred embodiment, the interrupt controller 214 can also influence the buffer flush management for a device. When a device finishes transferring data to or from the Bridge, there may be partially filled data in the write gathering buffer or unused prefetched data in the read buffer. The device can initiate an interrupt or do a memory write to specified address to flush the buffer and invalidate all the data in those buffers which are assigned to the device. If the device uses an interrupt pin to flush/invalidate data buffers, the interrupt packet will be sent after the data. The interrupt pins must be assigned to each device using the interrupt device register. Multiple pins can be assigned to a single device.

The memory latency issue is now described in further detail. As described above, the Bridge ASIC connects the PCI bus to the system bus. The system bus then connects to main memory. This means that the latency to main memory is longer than in a computer whereby the PCI bus is directly connects to main memory. By not connecting the PCI bus directly to the main memory, a computer can have multiple PCI buses, and the total I/O bandwidth of the system is not limited to the bandwidth of a single PCI bus.

To mitigate this longer memory latency, the Bridge can prefetch data from memory. When a PCI device first issues a read the Bridge will retry the read since it does not have any data for the read. Then the Bridge will send a request for a cache line, 128 bytes, to the destination. If the prefetch attribute is set then the Bridge will continue sending read requests for sequential cache lines. If the device is accessing data sequentially, the Bridge will have the data the device is requesting for the next transaction. The Bridge will stop sending requests for more cache lines when it runs out of read buffers assigned to that device, gets to a page boundary, or a condition has occurred that causes the read buffers to be flushed. Conditions that cause the prefetch buffers for a device to be flushed are: a non-sequential read is issued, the device issues a write, software invalidates the prefetch buffers, or the device generates an interrupt. Once the PCI device has read the last word in a data buffer the buffer is reused and the Bridge will send out another read request unless the read buffers have been flushed for some reason or the prefetcher has reached the end of the page.

The Bridge also supports write gathering to make main memory writes more efficient. The write gatherer holds 128 bytes. Each coherent memory write needs to send an invalidate or intervention to the processor. Writes that are less than a quarter cache line boundary will require a read-modify-write sequence to write the data into main memory. For these reasons, the write gatherer tries to convert partial cache line writes into cache line writes to main memory so that they can be handled much more efficiently. The write buffer is flushed when the PCI device issues a read, writes to a non-contiguous address, generates an interrupt, or is flushed by software.

For the first access to a region in main memory, the latency will be very long. If prefetching is used however, sequential accesses should be much faster since the data should be in the Bridge most of the time before the PCI device requests the data. The latency for the first access to a region depends on many factors, such as the priority of the device on the PCI bus, the number of PCI cards installed in the system at the same PCI priority; and the number and priority of devices connected to the system bus.

To maximize performance and efficiency of the whole computer, PCI devices should transfer 128 byte blocks that are aligned to a 128 byte boundary. Because the Bridge is optimized for this size transfer, it disconnects when it is the target of a read and gets to a 128 byte boundary even if it has prefetched the next cache line. This also limits a device's time on the bus to approximately 1 us ( i.e., the time to transfer one cache line for a 32 bit device assuming neither device stalls during the transfer).

During write transactions where the Bridge is the target, the Bridge disconnects at 128 byte boundaries or whenever a PCI device writes only part of a 32 byte aligned block. For example if a PCI device wants to write 67 bytes starting at address 32 with no data being transferred at bytes starting at address 32 with no data being transferred at byte address 68 (using the byte enables), the Bridge accepts the first 32 bytes from byte address 32 to 63 and it will accept the next 31 bytes from address 64 to 95, but then it will disconnect because the second 32 bytes were not contiguous. Only 63 bytes will be transferred even though the master wanted to transfer 67 bytes because the second block of 32 bytes was not contiguous.

It is therefore important that whenever possible a PCI device transfer 128 byte blocks that are aligned to 128 byte boundaries. This is very important when designing the buffering on a PCI device. The loss in efficiency will not only be in the memory system but also in arbitration, getting on and off the bus, and the address cycle to data overhead. Also, because the PCI arbiter is a round robin arbiter, a device in a busy system will have to wait its turn if a transfer takes multiple transactions.

It is also important to understand some of the address attributes that are used by the Bridge. These attributes are used to make transfers more efficient. If the prefetch attribute is set, then the Bridge holds on to data it reads from main memory until the PCI device that requested the data reads a byte or more of the last double word of the cache line, 128 bytes, or it is flushed for some reason. This attribute bit also causes the Bridge to read sequential data before the PCI device requests it. Prefetching is required to achieve any reasonable bandwidth on the PCI bus.

There are two basic types of reads: prefetched and not prefetched. The reads that are not prefetched are used when a small amount of data from sequential addresses is to be read. Prefetched reads are used when a lot of sequential data will be accessed. Read prefetching is required for reads from a PCI device to main memory in order to maintain reasonable read memory bandwidth. When a PCI device tries to read data from main memory which has not already been read by the Bridge, it will terminate the read with a retry. The Bridge will then issue one or more cache line reads to main memory if the prefetch attribute is set. The number of cache lines it will request depends on the number of read buffers software has assigned to that PCI device. There are 16 read buffers that have to be shared by all of the PCI devices. A PCI device can have a maximum of 8 read buffers assigned to it. Some time after the device was issued a retry, it will request the PCI bus again and try the read request again. The Bridge will continue issuing retries until it has the data from memory. Once it has the data, it will transfer the data until the initiator terminates the transfer or when a cache line boundary is crossed, the Bridge will issue a disconnect. The Bridge always disconnects on reads that cross cache line boundaries even if it has prefetched the next cache line of data.

The Bridge will continue issuing read requests to main memory reusing the buffers that the device has read to the end of, until it reaches a page boundary, or an event occurs that causes all of the buffers for that PCI device to be flushed. The page boundary can be programmed to be 4 K or 16 K bytes long.

For write gathering, the Bridge contains seven write buffers that are dynamically allocated. The write gatherer's function is to combine multiple write transactions on the PCI bus into one cache line sized transfer on the system bus. Four of the buffers can be used as write gatherers. Write gathering improves the system efficiency because it reduces the number of cache coherency operations to the processor since one is done for each system bus transaction if the coherency attribute is set and the memory system is optimized for cache line size operations. A PCI device can enable the write gatherer by setting the write gathering by setting the write gathering attribute in the device register. This enables write gathering for all writes that the device does using direct mapped space. A PCI device can only have one write gathering operation in progress at a time. When a PCI device writes to the end of a cache line, the buffer will always be written to memory.

A write buffer gets written to main memory when: 1) The PCI device that owns the write buffer issues a read; 2) The write data is not contiguous in address or the byte enables are not all asserted for each data transfer; 3) An interrupt occurs for the PCI device that owns the write buffer; 4) The processor accesses the write request buffer flush register; or 5) The PCI device writes anything to the region 0x3fff 0000 to 0x3fff ffff. The data on the write to this region is dropped by the Bridge.

Another attribute, known as the virtual request attribute, is for PCI devices that wish to have two outstanding prefetched read streams at the same time. Because of the rules of when the prefetch buffers get flushed, two outstanding streams would just thrash each other without the virtual request attribute. This attribute decouples the two streams so that requests for one stream do not affect the prefetch buffers for the other stream. Hence, the virtual request attribute is for PCI devices that need to have two concurrent prefetched read streams. Because of the rules of when the prefetch buffers get flushed, two outstanding streams would just thrash each other without the virtual request attribute. This attribute decouples the two streams so that requests for one stream do not affect the prefetch buffers for the other stream.

Hence, the virtual request attribute is for PCI devices that need to have two concurrent prefetched read streams. Because of the rules of when the prefetch buffers get flushed, two outstanding streams would just thrash each other. Hence, in light of this shortcoming, the virtual request attribute was implemented. This attribute effectively decouples the two streams so that requests for one stream do not affect the prefetch buffers for the other stream.

The virtual attribute can also support having one read stream and one write stream. Normally, a write will cause all of the prefetch read buffers for that PCI device to be invalidated, but if the read stream and the write stream have different virtual request attributes then the write will not invalidate any of the read buffers with the opposite virtual request attribute unless the cache line address of the read and write are the same. When the write occurs all of the read buffers with the same virtual request attribute will be invalidated. When a PCI device issues a write, the address is compared to the addresses of all of the read buffers owned by that PCI device, including ones with the opposite virtual request attribute and if there are any matches that read buffer is invalidated.

The virtual request attribute is only available for PCI devices that issue dual address cycles. This attribute is not present in the page map or in direct mapped space. This feature can be very useful for any PCI device that requires two unrelated concurrent transfers. When read buffers are assigned to a device the virtual request attribute is also assigned to the buffer.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer system comprising:
    a routing mechanism for routing packets of data;
    a processor coupled to the routing mechanism for processing the data;
    a memory coupled to the routing mechanism for storing the data;
    a PCI bus for conveying PCI format data;
    a PCI device coupled to the PCI bus;
    a bridge coupled between the routing mechanism and the PCI bus for providing an interface between the PCI bus and the routing mechanism;
    a plurality of write buffers coupled to the bridge, wherein a plurality of write transactions on the PCI bus are combined into one cache line sized transfer to the routing mechanism;
    a plurality of read buffers coupled to the bridge, wherein data fetched according to a read request from the device is stored in the read buffers and the device can access the read buffer multiple times to retrieve the data;
    a prefetcher coupled to the bridge, wherein when the PCI device generates a read request and there is no corresponding data contained in the read buffers, the bridge reads sequential cache lines until the read buffers are full, a page boundary is encountered, or the read buffers are caused to be flushed.

2. The computer system of claim 1, wherein the read buffers are flushed when a non-sequential read is issued, the device issues a write, or the buffers are invalidated.

3. The computer system of claim 1, wherein there are different types of read operations including a precise read operation.

4. The computer system of claim 1 further comprising an interrupt controller coupled to the PCI bus, wherein the interrupt controller performs buffer management for devices coupled to the PCI bus by using an interrupt signal.

5. The computer system of claim 1 further comprising a mechanism for performing write gathering, wherein a plurality of write transactions on the PCI bus are combined into one cache line sized transfer to the routing mechanism.

6. The computer system of claim 3, wherein the different types of read operations include a non-precise read operation.

7. The computer system of claim 6, wherein the different types of read operations include a pre-fetch read operation.

8. A computer system comprising:
    a routing mechanism for routing packets of data;
    a processor coupled to the routing mechanism for processing the data;
    a memory coupled to the routing mechanism for storing the data;
    a PCI bus for conveying PCI format data;

a PCI device coupled to the PCI bus;

a bridge coupled between the routing mechanism and the PCI bus for providing an interface between the PCI bus and the routing mechanism;

a plurality of write buffers coupled to the bridge, wherein a plurality of write transactions on the PCI bus are combined into one cache line sized transfer to the routing mechanism;

a controller coupled to the PCI bus for controlling multiple streams of data and multiple virtual buffers so that a bit is used to select or clear particular virtual buffers.

9. In a computer system, a method for minimizing memory latencies corresponding to memory accesses through a bridge coupled between a memory and a device, comprising the steps of:

issuing a write request by the device;

transmitting the write request over a PCI bus to the bridge;

combining a plurality of write requests;

storing the write requests into a write buffer;

transmitting a single write transaction corresponding to the combination of write requests from the bridge to the memory through a routing mechanism;

pre-fetching data from the memory according to a read request generated by the device;

storing the data in a plurality of read buffers coupled to the bridge;

accessing the read buffer multiple times to retrieve the data;

continuing to prefetch data until either the read buffers are full, a page boundary is encountered, or the read buffers are caused to be flushed.

10. The method of claim 9 further comprising the step of flushing the read buffers flushed when a non-sequential read is issued, the device issues a write, or the buffers are invalidated.

11. The method of claim 9, wherein there are different types of read operations including a precise read operation.

12. The method of claim 9 further comprising the step of performing buffer management for devices coupled to the PCI bus by using an interrupt signal.

13. The computer system of claim 9 further comprising the step of write gathering, wherein a plurality of write transactions on the PCI bus are combined into one cache line sized transfer to the routing mechanism.

14. The method of claim 11, wherein the different types of read operations include a non-precise read operation.

15. The method of claim 14, wherein the different types of read operations include a pre-fetch read operation.

16. In a computer system, a method for minimizing memory latencies corresponding to memory accesses through a bridge coupled between a memory and a device, comprising the steps of:

issuing a write request by the device;

transmitting the write request over a PCI bus to the bridge;

combining a plurality of write requests;

storing the write requests into a write buffer;

transmitting a single write transaction corresponding to the combination of write requests from the bridge to the memory through a routing mechanism;

controlling multiple streams of data and multiple virtual buffers, wherein a bit is used to select or clear particular virtual buffers.

* * * * *